US006610342B2

(12) United States Patent
Swan

(10) Patent No.: US 6,610,342 B2
(45) Date of Patent: Aug. 26, 2003

(54) PROCESS FOR REMOVING OFF-FLAVORS AND ODORS FROM FOODS AND BEVERAGES

(75) Inventor: James S. Swan, Longnddry (GB)

(73) Assignee: Independent Stave Company, Lebanon, MO (US)

( * ) Notice: Subject to any disclaimer, the term of this patent is extended or adjusted under 35 U.S.C. 154(b) by 20 days.

(21) Appl. No.: 09/849,207

(22) Filed: May 4, 2001

(65) Prior Publication Data

US 2002/0022075 A1 Feb. 21, 2002

Related U.S. Application Data

(60) Provisional application No. 60/204,870, filed on May 16, 2000.

(51) Int. Cl.[7] .......................... C12G 1/00; C12H 1/056
(52) U.S. Cl. ........................ 426/422; 426/487; 426/592
(58) Field of Search .............................. 426/422, 487, 426/592

(56) References Cited

U.S. PATENT DOCUMENTS 4,276,179 A 6/1981 Soehngen
5,206,043 A * 4/1993 White
6,152,966 A * 11/2000 Conrad et al.

FOREIGN PATENT DOCUMENTS

| GB | 2086846 | * | 5/1982 |
| JP | 61174240 | | 8/1986 |
| WO | WO 01/55292 | | 8/2001 |

OTHER PUBLICATIONS

"Absorption of Chloranisoles From Wine By Corks and By Other Materials", Australian Journal of Grape and Wine Research, vol. 5, No. 3, 1999, pp. 91–98.
*Sorption of Chloranisole Vapors by Raisin Packaging Material*, Journal of Stored Products Research, Oct. 1996, vo. 32, No. 4, pp. 303–306(4) by Rij R.E. et al.

* cited by examiner

*Primary Examiner*—Anthony J. Weier
(74) *Attorney, Agent, or Firm*—Peter S. Gilster; Linda L. Lewis; Greensfelder, Hemker & Gale, P.C.

(57) ABSTRACT

A process of removing off-flavors and off-odors, such as caused by TCA, from food or beverage products by contacting the food or beverage with one or more aliphatic synthetic polymers so as to sufficiently lower the concentration of the off-flavors and off-odors that they are undetectable by taste or smell.

13 Claims, No Drawings

PROCESS FOR REMOVING OFF-FLAVORS AND ODORS FROM FOODS AND BEVERAGES

CROSS REFERENCE TO RELATED APPLICATION

This patent application is based on and claims the priority of Provisional Patent Application Serial No.: 60/204,870, entitled "Process for Removing Off-Flavors and Odors from Foods and Beverages" filed May 16, 2000, herein incorporated by reference, and continued preservation of which is requested.

FIELD OF THE INVENTION

The present invention relates to the use of aliphatic synthetic polymers to remove soluble off-flavors and off-odors from food and beverage products. More specifically, the present invention relates to the use of ultra high molecular weight polyethylene so as to lower 2,4,6-trichloroanisole (TCA) concentration in beverages such as fruit juice, whiskey, wine and beer such that the TCA is undetectable by taste or smell. Concentrations of TCA in treated wine are typically undetectable below about 5 parts per trillion (ppt).

RELATED ART

Cork is widely used as a stopper for casings. Such casings include bottles filled with liquor such as wine, brandy or whisky, or casings packed with various kinds of foods. Although cork has no intrinsic odor or taste, fungi on cork or other sources of wood lignin, such as wooden barrels, can form off-flavors or off-odors, such as 2,4,6-trichloroanisole (TCA). The TCA has a distinct flavor and can be detected by taste or smell at levels as low as in the parts per trillion range. It is generally described as a moldy or musty flavor or odor. To be undetectable by taste or smell, the concentration of TCA needs to be below about 10 ppt, preferably below about 5 ppt.

It is theorized that the mechanism of formation of TCA is by the production of trichlorophenol by fungi (principally penicillium frequentans) followed by methylation of the phenolic moieties. Chlorine generally comes in the form of free chlorine contained in the water supply or from the sodium hypochlorite used to clean corks.

U.S. Pat. No. 5,353,417 address the problem of removing TCA from contaminated corks by steaming the corks. U.S. Pat. No. 5,484,620 discloses a process wherein organic granular polymer particles of synthetic origins, such as polyvinylpolypyrrolidone (PVPP) and/or polyethylene are compressed, heated, sintered, ground and screened to provide a stabilizing and/or filter aid. This process is used to remove haze-forming insoluble polyphenols and proteins from beer, wine or beverages and acts as a filter to remove suspended particles.

U.S. Pat. No. 4,276,179 (Soehngen) discloses the use of polyethylene having a surface area of from about 10 to 40 square meters to remove chlorinated organics from aqueous solutions. This patent is directed at removing PCB and DDT from drinking water at levels of from about 0.001 to 10 ppm. The TCA of the present invention is being lowered to a level generally less than about 10 ppt, significantly lower than the level disclosed by Soehngen.

U.S. Pat. No. 5,681,603 discloses the use of nonionic resins such as crosslinked divinylbenzene resins to remove polynuclear aromatic compounds such as benzo(a)pyrenes from liquid smoke products.

None of the above references disclose the use of polyethylene to remove soluble off-flavors and smells, such as TCA, from foods and beverages so that they are undetectable.

SUMMARY OF THE INVENTION

The present invention relates to a process for removing soluble off-flavors and off-odors from food or beverage products comprising contacting the food or beverage with one or more aliphatic synthetic polymers to sufficiently lower the concentration of the off-flavors and off-odors that they are undetectable by taste or smell. More specifically, the present invention comprises a process to remove soluble off-flavors or smells from beverages by contacting the beverage with polyethylene to sufficiently lower the concentration of the off-flavors and smells that they are undetectable by taste or smell.

DETAILED DESCRIPTION OF THE INVENTION

Foods and beverages are treated in the claimed process. Foods that can be treated using synthetic aliphatic polymers are either liquid or liquefied. Such foods include soups, sauces, broths, purees, gravies, etc. Virtually any type of beverage can be treated using the claimed method, including juices, beers, wines, whiskeys, punches, flavored or unflavored waters, etc.

The present invention uses synthetic aliphatic polymers to sufficiently lower the concentration of off-flavors and off-odors in foods and beverages such that the off-flavors and off-odors are undetectable by taste or smell. Suitable synthetic aliphatic polymers include PE (polyethylene), HDPE (high density polyethylene), PP (polypropylene), HDPP (high density polypropylene) and UHMW PE (ultra-high molecular weight polyethylene). The preferred polymer is UHMW PE. Optionally, the UHMW PE is chemically modified to have acid and hydroxyl groups. Typically, the polymers are used in a granulated form.

A suitable modified UHMW PE is manufactured by Ticona and is sold as GUR4150. The GUR4150 has an average particle diameter of about 120±20 $\mu$m. The density of GUR4150 is about 0.93 g/cm$^3$. The average molecular weight, as determined by viscosity, is about 9.2×10$^6$ g/mol. GUR4150 is marketed as a paint additive, along with other uses. It is not suggested by the product literature that GUR4150 is suitable for removing off-flavors or smells from foods or beverages, or for treating foods or beverages in any way.

The process of removing off-flavors and smells involves contacting the food or beverage with the polymer. Typically, the polymer, in a granular form, is washed with water. This wets the polymer, and removes any residual "plastic" flavor in the polymer. Preferably, the water is warm, about 50° C. The amount of polymer to food product or beverage needed to remove off-flavors and smells is variable, depending on the concentration of the off-flavor or smell compound. Typically, about 150 g of polymer is needed to treat about 1 liter of food or beverage, e.g., about 150 g per liter.

The food or beverage can be treated in a batch-wise, semi-batch or continuous manner. Food or beverage can be charged to a tank and the polymer added with mixing. After the food is treated, the polymer particles are removed by filtration. Optionally, the polymer can be allowed to settle to the bottom of the tank, and the liquid food or beverage decanted off. Those skilled in the art can determine a variety of ways of treating the food or beverage with the polymer and separating the final product. The treatment typically takes place at room temperature, although the food or beverage can be cooled or heated as needed.

The food or beverage treated according to the present invention does not suffer negative effects with the treatment, but loses its off-flavor or smell. A slight loss of color or flavors may be noted, but there is no significant negative effect. The TCA concentration is reduced to about 10 ppt, preferably 5 ppt or less, and the TCA taste and smell is therefore undetectable.

The following examples are to illustrate the claimed invention and are not intended to limit the claims in any way.

EXAMPLES

Three wines were selected for treatment: Rosemount Shiraz, Maglieri Grenache, and Rosemount Chardonnay. The wines were analyzed before testing. About 80 ng per liter of TCA was added to the wine, producing a very musty smelling and tasting wine. About 0.75 L of the wine was passed at a rate of about 5 mL/min, a bed of 70 mL (about 63 g) of GUR4150 polymer particles. The wine was analyzed again, and the results are summarized in Tables 1 and 2, below.

The results are:

|  | Wine 1 Rosemount Shiraz | | Wine 2 Maglieri Grenache | | Wine 3 Rosemount Chardonnay | |
| --- | --- | --- | --- | --- | --- | --- |
|  | BEFORE | AFTER | BEFORE | AFTER | BEFORE | AFTER |
| Colour[1] | 0.72/ 0.95 | 0.75/ 0.84 | 0.75/ 0.56 | 0.79/ 0.43 | 0.12 | 0.11 |
| Total acidity | 0.64 | 0.64 | 0.62 | 0.60 | 0.63 | 0.64 |
| pH | 3.52 | 3.52 | 3.31 | 3.34 | 3.43 | 3.44 |
| Wood Extract. | | | | | | |
| Gallic acid | 64 | 62 | 79 | 55 | 9.4 | 7.6 |
| Ellagic acid[2] | 5.4 | 6.4 | 3.6 | 3.2 | 1.4 | 1.1 |
| Hmf | 0.9 | 0.9 | 1.6 | 0.9 | 3.8 | 2.8 |
| Furfural[2] | 1.4 | 1.4 | 0.7 | 0.7 | 4.0 | 3.7 |
| 5-Methyl furf. | 1.3 | 1.3 | 1.1 | 0.9 | 0.8 | 0.9 |
| Vanillic acid | 7.2 | 6.3 | 8.9 | 5.7 | 1.0 | 0.9 |
| Syringic acid | 3.0 | 3.8 | 3.1 | 3.0 | 2.3 | 2.0 |
| Vanillin | 0.7 | 0.7 | 0.5 | 0.5 | 1.0 | 0.9 |
| Syringaldehyde | 1.4 | 0.9 | 1.1 | 1.0 | 2.7 | 2.7 |
| Coniferaldehye | 0.4 | 0.3 | 0.6 | 0.4 | 0.2 | 0.2 |
| Wine phenolics | | | | | | |
| Protocatech. Ac[2] | 9.5 | 7.6 | 10.1 | 7.7 | 5.9 | 5.3 |
| Catechins | 13.7 | 8.3 | 3.8 | 1.3 | 1.1 | 0.7 |
| Chlorogenic ac. | 0.1 | 0.1 | 0.6 | 0.6 | 0.2 | 0.3 |
| Caffeic acid | 0.4 | 0.2 | 0.6 | 0.5 | 2.2 | 2.4 |
| Myricetin | 8.4 | 4.6 | 8.5 | 5.7 | 0.3 | 0.3 |
| Quercetin | 9.6 | 4.2 | 7.5 | 7.0 | 8.6 | 8.0 |

Notes
[1] color in red wines is abs. at 420/430 nm then abs. 420 + 430 nm. For white wine the value is absorbance at 420 nm only. See text
[2] comes from wood and wine
Rosemount Shiraz was the 'Gold Label' product
Extractives and wine phenolics results are in milligrams per liter 'as-is' determined by hplc TCA levels on the various wines are shown in the following table:

|  |  | TCA[3] |
| --- | --- | --- |
| Wine 1 | | |
| Maglieri Grenache | untreated | 8.9 |
|  | after addition of TCA | 59.4 |
|  | post resin treatment | 6.4 |
| Wine 2 | | |
| Rosemount Gold Shiraz | Untreated | 6.7 |
|  | after addition of TCA | 87.5 |
|  | Post resin treatment | 6.4 |
| Wine 3 | | |
| Rosemount Chardonnay | untreated | NA |
|  | after addition of TCA | >80 |
|  | Post resin treatment | 2.8 |

Note 3. Values are in nanograms per liter (ppt)

In each case, the amount of TCA was lower for the treated wine than the original untreated wine. Effectively, all of the added TCA was removed. Some changes were noted in the wines after treatment. The changes were small and generally consistent with the absorptive action of passing a liquid through a filter medium. In some cases a slight change in color was seen, provided that the samples were compared closely and in the opinion of some tasters there was a small flavor change.

Although the invention is described with preferred embodiments, it is to be understood that variations and modifications will be apparent to those skilled in the art. Such variations and modifications are to be considered within the purview and scope of the claims.

What is claimed is:

1. A process for removing soluble off-flavors and off-odors from food or beverage products comprising contacting the food or beverage with one or more aliphatic synthetic polymer so as to sufficiently lower the concentration of the off-flavors and off-odors in the treated food or beverage that they are undetectable by taste or smell, wherein the aliphatic synthetic polymer is selected from the group consisting of UHMW PE and UHMW PE chemically treated to contain acid and hydroxyl groups.

2. The process of claim 1, wherein the beverages are selected from the group consisting of fruit juices, whiskey, wine and beer.

3. The process of claim 1, wherein the beverage is wine.

4. The process of claim 3, wherein the off-flavors and off-odors are caused by TCA.

5. The process of claim 4, wherein the treated wine has a TCA concentration below about 10 ppt.

6. A process to remove TCA from wine comprising contacting the wine with UHMW PE or with UHMW PE chemically treated to contain acid or hydroxyl groups, to lower the TCA concentration in the treated wine such that is undetectable by taste or smell.

7. The process of claim 6, wherein the concentration of TCA in the treated wine is less than about 10 ppt.

8. The process of claim 6, wherein the concentration of TCA in the treated wine is less than about 5 ppt.

9. A process for removing TCA from food or beverage products comprising contacting the food or beverage with one or more aliphatic synthetic polymer so as to lower the concentration of the TCA in the treated food or beverage to 10 ppt or less.

10. The process of claim 9, wherein the beverages are selected from the group consisting of fruit juices, whiskey, wine and beer.

11. The process of claim 9, wherein the beverage is wine.

12. The process of claim 9, wherein the aliphatic synthetic polymer is at least one of the group consisting of PE, HDPE, PP, HDPP and UHMW PE.

13. The process of claim 1, wherein the aliphatic synthetic polymer is UHMW PE chemically treated to contain acid and hydroxyl groups.

* * * * *